G. J. EVANS.
STENCIL HOLDER.
APPLICATION FILED NOV. 16, 1917.
1,274,864.
Patented Aug. 6, 1918.
3 SHEETS—SHEET 1.
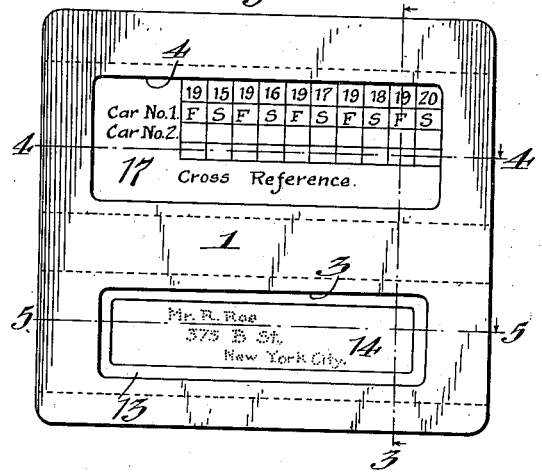
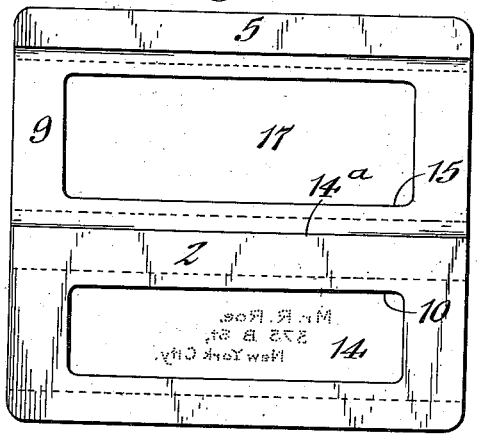
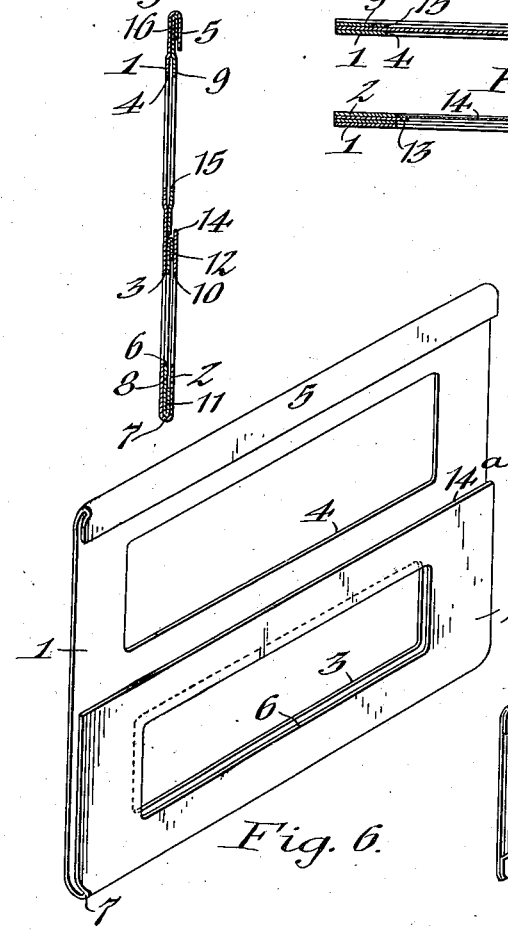
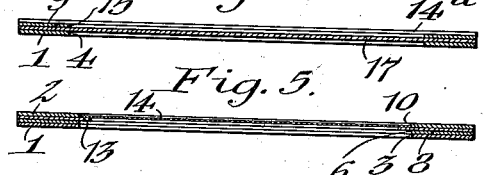
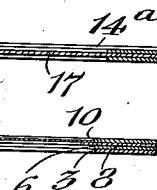
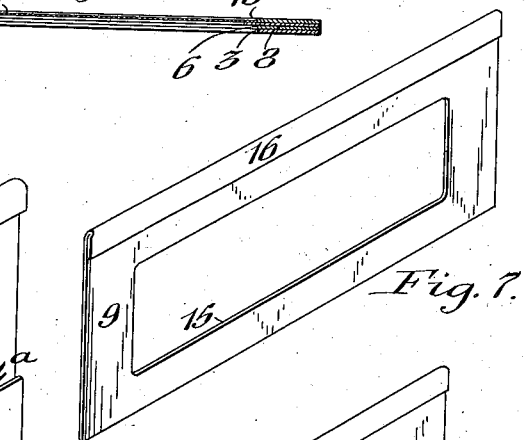
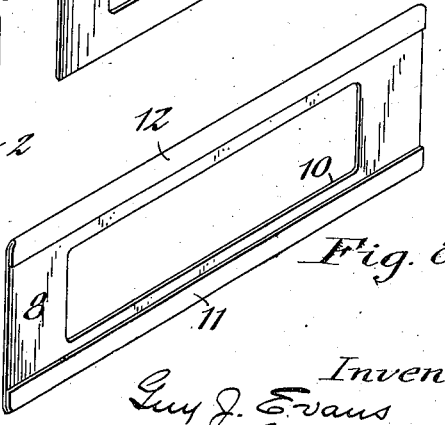
Inventor,
Guy J. Evans
by *Luper & Popp*
Attorneys.

G. J. EVANS.
STENCIL HOLDER.
APPLICATION FILED NOV. 16, 1917.
1,274,864.
Patented Aug. 6, 1918.
3 SHEETS—SHEET 2.
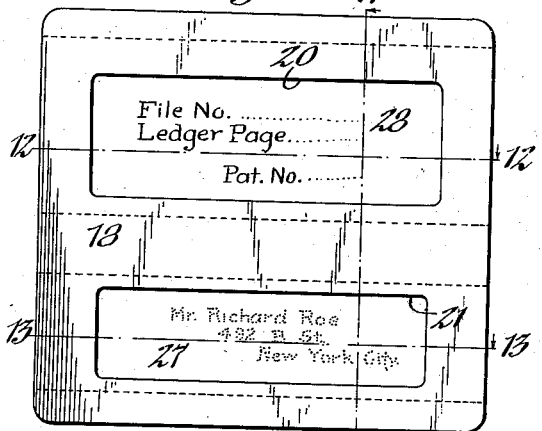
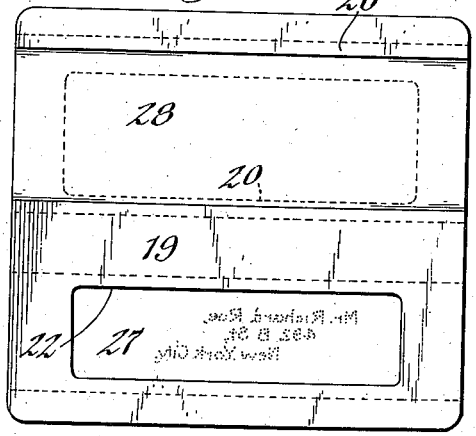
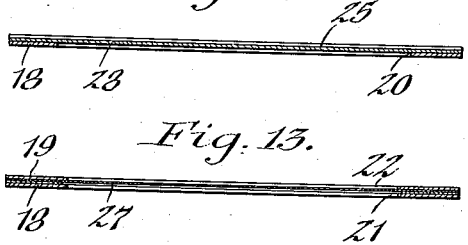
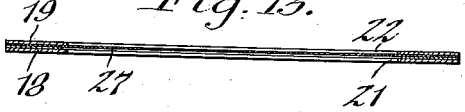
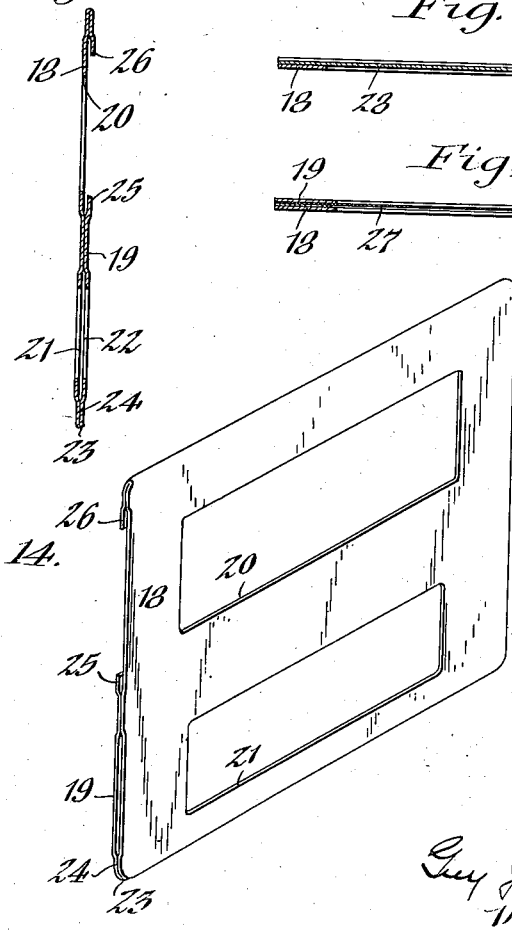
Inventor,
Guy J. Evans
by Geyer & Popp
Attorneys.

G. J. EVANS.
STENCIL HOLDER.
APPLICATION FILED NOV. 16, 1917.
1,274,864.
Patented Aug. 6, 1918.
3 SHEETS—SHEET 3.
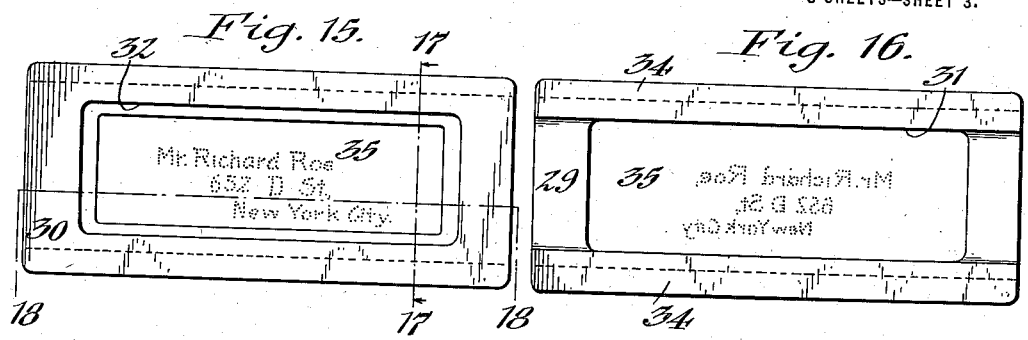
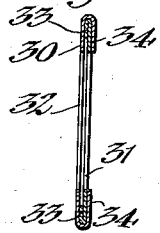
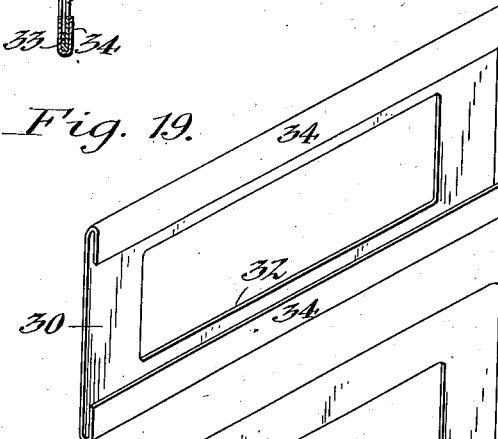
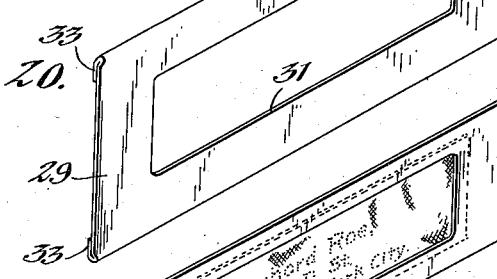
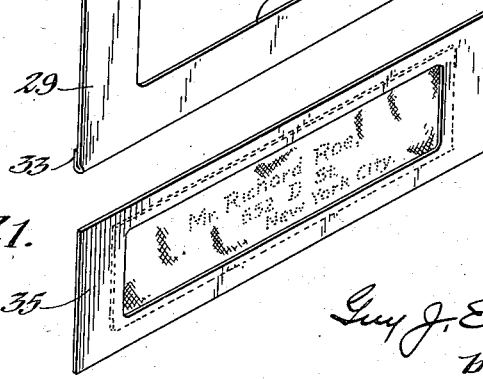
Inventor,
Guy J. Evans,
by Meyer & Popp
Attorneys.

UNITED STATES PATENT OFFICE.

GUY J. EVANS, OF BUFFALO, NEW YORK.

STENCIL-HOLDER.

1,274,864. Specification of Letters Patent. Patented Aug. 6, 1918.

Application filed November 16, 1917. Serial No. 202,281.

*To all whom it may concern:*

Be it known that I, GUY J. EVANS, a citizen of the United States, residing at Buffalo, in the county of Erie and State of New York, have invented new and useful Improvements in Stencil-Holders, of which the following is a specification.

This invention relates to stencil holders used in addressing machines for successively addressing envelops, letters, cards, sheets and other matter which is to be mailed, and more particularly to stencils which permit the address filler and record filler to be changed from time to time when necessary so that the same holder can be used with different fillers.

It is the object of this invention to provide a holder of this character which is strong and durable in construction, low in cost of manufacture, and permits of readily and conveniently substituting new address and record fillers for those which are obsolete or of no further use.

In the accompanying drawings:

Figure 1 is a front view of one form of holder embodying my invention. Fig. 2 is a rear view of the same, and Fig. 3 is a transverse section, taken on line 3—3, Fig. 1 with the address and record fillers omitted. Figs. 4 and 5 are longitudinal sections taken in the correspondingly numbered lines in Fig. 1. Figs. 6, 7 and 8 are perspective views of the different members forming the stencil holder shown in Figs. 1–6. Fig. 9 is a front view of another form of stencil-holder showing my improvements. Fig. 10 is a rear view of the same. Fig. 11 is a transverse section taken in line 11—11, Fig. 9 with the address and record fillers omitted. Figs. 12 and 13 are longitudinal sections taken in the correspondingly numbered lines in Fig. 9. Fig. 14 is a perspective view of the holder shown in Figs. 9–13. Fig. 15 is a face view of still another form of stencil-holder containing my invention. Fig. 16 is a rear view of the same. Fig. 17 is a cross section taken in line 17—17, Fig. 15, with the address filler omitted. Fig. 18 is a longitudinal section taken in line 18—18, Fig. 15. Figs. 19, 20 and 21 are perspective views of the different elements of the stencil, shown in Figs. 15–18.

Similar characters of reference refer to like parts throughout the several views.

Referring to the construction of stencil shown in Figs. 1–8, the holder of the same comprises two outer frame sections 1, 2 the member 1 being comparatively wide and the member 2 relatively narrow, both of these members being of the same length. The wide outer frame section 1 is provided with sight openings 3, 4 which are arranged transversely side by side, one of these openings, for instance the opening 3, being intended to expose a stencil filler, and the other opening 4 being intended to expose a record filler. On that longitudinal edge of the wide outer frame section adjacent to the record opening 4 thereof, the same is provided with a longitudinal flange 5 which is folded inwardly over the front side of this frame-section. The narrow outer frame section 2 is arranged along the front side of the wide outer frame section and is provided with a sight opening 6 which registers with the stencil-sight opening 3 of the wide outer frame section. The outer longitudinal edges of the wide and narrow outer frame sections are connected with each other, as shown at 7, and these sections together with the flange 5 are preferably formed integrally from a single sheet of paper or other suitable material.

8, 9 represent two intermediate frame-sections which are comparatively narrow and arranged edge to edge and of the same length or substantially so as the outer frame sections. The intermediate frame section 8 is arranged between the narrow outer frame section 2 and the adjacent part of the wide outer frame section 1, and is provided with a sight-opening 10 which registers with the corresponding openings 3, 6, in the wide and narrow outer frame sections, and this intermediate frame section is also provided at its opposite longitudinal edges with longitudinal spacing flanges 11, 12, which are turned over the body-portion of this intermediate frame section and secured thereto by cement or other adhesive. The intermediate frame section 8 is secured at its longitudinal edge portions to the opposing sides of the narrow outer frame-section and the adjacent part of the wide outer frame section by means of cement or the like, thereby forming between this intermediate frame section and both outer frame sections, two slits or passageways which are open at both ends and into either one of which may be introduced a stencil filler from either end thereof. This stencil filler may be of any suitable construction but preferably comprises a filler-frame 13 and a panel 14 applied to said filler frame across the opening therein, which panel consists of a stenciled sheet of material which permits an address to be written, perforated or cut thereon. The frame and panel of this stencil filler are sufficiently flexible so that they may be bent around an ordinary curved typewriter platen to permit the writing, cutting or perforating of the address in the stencilized panel or sheet, by the type of the writing machine. The holder of the stencil, although constructed of paper or other thin material, is however sufficiently stiff to permit of properly feeding the stencils one at a time from a stack in an addressing machine to the printing position and then to the place where the stencils are again accumulated in a pile preparatory to being used again.

The width of the intermediate frame section which forms part of the stencil filler receptacle, is less than the width of the narrow outer frame section and is so mounted between this last mentioned frame section and the wide outer frame section, so that the inner longitudinal edge of the narrow outer frame section projects beyond the inner longitudinal edge of the intermediate frame section 8 and forms a longitudinal flange or guide 14ª thereon. The intermediate frame section 9 is arranged along the wide outer frame section in the same plane as the narrow outer frame section and is provided with a sight-opening 15 which registers with the sight-opening 4 in the adjacent part of the wide outer frame section. The inner longitudinal edge of the intermediate frame section 9 is arranged in the space between the flange 14ª of the narrow outer frame section and the adjacent longitudinal edge of the wide outer frame section and is secured along this longitudinal edge to the wide outer frame section by means of glue or the like. At its outer longitudinal edge the intermediate frame section 9 is provided with an inwardly-folded longitudinal flange 16 which is secured to this frame section by a suitable adhesive and also secured adhesively to the inner side of the longitudinal flange 5 of the wide outer frame section. The transverse edges of the intermediate frame section 9 and the wide outer frame section are disconnected from each other, thereby forming a slit, pocket or passageway between this intermediate frame section and the wide outer frame section, which is open at opposite ends of the stencil holder and permits of introducing a record filler or sheet 17 into this slit from either end thereof. Both sides of this record filler or sheet are exposed on opposite sides of the holder so that a record of any suitable character may be inscribed thereon, for instance, a record associated with the name of the party or concern represented by the companion stencil-filler. If only one side of this record sheet is required, one or the other of the openings 4, 15 in the wide outer frame section and the intermediate frame section may be omitted, but it is preferable to employ both inasmuch as it permits of the fullest use of the recording facilities which are possible, as well as reducing the weight of the stencil as a whole and economizing in the amount of material which is used. When the record sheet or filler has been used up to its fullest capacity, the same may be withdrawn and replaced by another empty filler.

It will be apparent that both the address filler and the record filler may be replaced from time to time and the same holder used repeatedly with different fillers.

Furthermore, this construction of holder is very strong and durable so that it will not break down when used repeatedly, it can be produced at comparatively low cost and owing to its compact construction, a large number of the same can be stored in a small space.

In the construction shown in Figs. 9–14, 18 represents a comparatively wide frame section and 19 a relatively narrow frame section which are preferably constructed from a single sheet of paper or similar material. The wide frame section 18 is provided with two sight openings 20, 21 which are arranged transversely side by side, the opening 21 being intended to expose an address filler while the opening 20 is adapted to expose a record filler. The narrow frame section 19 is arranged at one side of the wide frame section adjacent to one longitudinal edge of the same and is provided with a sight opening 22 which registers with the sight opening 21 of the wide frame section. The adjacent outer longitudinal edges of these two frame sections are integrally connected, as shown at 23, and also preferably connected by cement adjacent to this edge, as shown at 24, and these two frame sections are also connected with each other by cement or the like, lengthwise intermediate of the sight openings 21, 22 and the inner longitudinal edge of the narrow frame section 19 so as to leave the inner longitudinal edge portion 25 of this narrow frame section unattached to the wide frame section and thereby form a longitudinal guideway between these parts of these frame sections. On that longitudinal edge of the outer frame section adjacent to the outer edge of the sight opening 20 the same is provided with a folded longitudinal flange 26 which is formed integrally therewith and also secured thereto by a suitable adhesive so as to leave the inner edge portion of this flange unattached to the wide frame section and form therewith an outer longitudinal guide way.

The slit or pocket between the narrow and wide frame sections is adapted to receive an address filler 27 which may be inserted or removed therefrom at either end thereof, and the guideways 25, 26 which are formed on the wide frame section adjacent to opposite longitudinal edges of its sight opening 20 are adapted to receive the longitudinal edge of a record filler 28 which latter may also be inserted and removed from either end of the holder. These address and record fillers are similar to those described with reference to the construction shown in Figs. 1 and 8.

The construction of the holder shown in Figs. 15-21 comprises two frame sections 29, 30 arranged side by side and provided with corresponding sight openings 31, 32 through which the stencil filler or sheet placed between these frame sections is exposed on opposite sides of this holder. At its opposite longitudinal edges the frame section 29 is provided with inwardly folded longitudinal flanges 33, 33 which are secured to this frame section by means of a suitable cement and the longitudinal edge portions of this frame section are arranged between the longitudinal edge portions of the other frame section 30 and longitudinal inwardly turned or folded flanges 34, 34 arranged on the corresponding edges of the frame section 30. The longitudinal edge portions of these two frame sections and their flanges are secured together by means of cement and form between these frame sections a longitudinal slit or pocket which is open at opposite ends of the holder and into which a stencil filler 35 may be introduced for use in an addressing machine and removed therefrom so as to permit of using this frame with another filler.

Owing to the simplicity of the several stencil holders shown, the same can be produced at comparatively low cost and it is possible to readily replace the fillers so as to permit of using these holders repeatedly with different fillers, thereby reducing the cost of addressing mail matter in this manner.

I claim as my invention:

1. A stencil holder comprising two frame sections which are arranged side by side and receive a filler between them and are provided with corresponding openings, through which the filler is exposed, and one of said frame sections being provided with a longitudinal folded portion which overlaps and is secured to the adjacent edge of the other frame section.

2. A stencil holder comprising two frame sections which are arranged side by side and receive a filler between them and are provided with corresponding openings through which the filler is exposed, and one of said frame sections being provided with a longitudinal inner flange which is folded upon the respective frame section and the other frame section being provided with another longitudinal portion which is folded upon said inner flange and secured thereto.

3. A stencil holder comprising two frame sections arranged side by side and adapted to receive a filler between them and provided with corresponding openings through which the filler is exposed, one of said frame sections being provided with inner flanges at its opposite longitudinal edges which are folded upon the respective frame section and the other frame section having a folded portion at one of its longitudinal edges which engages with one of said inner flanges and is secured thereto.

4. A stencil holder comprising two frame sections one of which is wide and provided adjacent to one of its longitudinal edges with an opening and an inwardly turned flange at its opposite longitudinal edge forming an outer guide and the other frame section being narrow and provided with an opening which registers with the opening of the wide frame section and has its inner edge forming an inner guide which coöperates with said outer guide.

5. A stencil holder comprising two frame sections one of which is provided with two openings arranged transversely side by side and the other being narrow and having an opening registering with one of the openings of said wide frame section the inner longitudinal edge of said narrow frame section forming an inner guide on one side of the other opening in the last mentioned frame and the latter being provided adjacent to its last mentioned opening with an inwardly turned flange forming an outer guide.

6. A stencil holder comprising two outer frame sections one of which is wide and provided adjacent to one of its longitudinal edges with an opening and adjacent to its opposite longitudinal edge with an inwardly turned flange forming an outer guide, and the other outer frame being narrow and having an opening registering with the opening of the wide frame section and having its inner longitudinal edge forming an inner guide which coöperates with said outer guide and an intermediate frame section arranged between said wide and narrow frame sections and provided with an opening registering with the openings of said wide and narrow outer frame sections.

7. A stencil holder comprising two outer frame sections one of which is wide and provided adjacent to one of its longitudinal edges with an opening and adjacent to its opposite longitudinal edge with an inwardly turned flange forming an outer guide, and the other outer frame being narrow and having an opening registering with the opening of the wide frame section and having its inner longitudinal edge forming an inner guide which coöperates with said outer guide and an intermediate frame section arranged between said wide and narrow frame sections and provided with an opening registering with the openings of said wide and narrow outer frame sections and provided at its opposite longitudinal edges with inwardly folded flanges.

8. A stencil holder comprising two outer frame sections one of which is wide and provided adjacent to one of its longitudinal edges with an opening and adjacent to its opposite longitudinal edge with an inwardly turned flange forming an outer guide, and the other outer frame being narrow and having an opening registering with the opening of the wide frame section and having its inner longitudinal edge forming an inner guide which coöperates with said outer guide and two narrow intermediate frame sections one of which is arranged between said wide outer frame section and said narrow outer frame section and provided with an opening registering with the openings in said outer frame sections and the other intermediate frame section having its opposite longitudinal edges arranged underneath the inner edge portion of said narrow outer frame section and the outer guide flange of said wide outer frame section.

9. A stencil holder comprising two outer frame sections one of which is wide and provided adjacent to one of its longitudinal edges with an opening and adjacent to its opposite longitudinal edge with an inwardly turned flange forming an outer guide, and the other frame being narrow and having an opening registering with the opening of the wide frame section and having its inner longitudinal edge forming an inner guide which coöperates with said outer guide and two narrow intermediate frame sections one of which is arranged between said wide outer frame section and said narrow outer frame section and provided with an opening registering with the openings in said outer frame section and provided at its opposite longitudinal edges with folded flanges, and the other intermediate frame section having its opposite longitudinal edges arranged underneath the inner edge portion of said narrow outer frame section and the outer guide flange of said wide outer frame section.

10. A stencil holder comprising two outer frame sections one of which is wide and provided adjacent to one of its longitudinal edges with an opening and adjacent to its opposite longitudinal edge with an inwardly turned flange forming an outer guide, and the other outer frame being narrow and having an opening registering with the opening of the wide frame section and having its inner longitudinal edge forming an inner guide which coöperates with said outer guide and two narrow intermediate frame sections one of which is arranged between said wide outer frame sections and said narrow outer frame section and provided with an opening registering with the openings in said outer frame sections and the other intermediate frame section having its inner longitudinal edges arranged between the wide outer frame section and the inner edge portion of said narrow outer frame section while its outer longitudinal edge is arranged between said wide outer frame section and the outer guide thereof.

11. A stencil holder comprising two outer frame sections one of which is wide and provided adjacent to one of its longitudinal edges with an opening and adjacent to its opposite longitudinal edge with an inwardly turned flange forming an outer guide, and the other outer frame being narrow and having an opening registering with the opening of the wide frame section and having its inner longitudinal edge forming an inner guide which coöperates with said outer guide and two narrow intermediate frame sections one of which is arranged between said wide outer frame section and said narrow outer frame section and provided with an opening registering with the openings in said outer frame section and the other intermediate frame section having its inner longitudinal edges arranged between the wide outer frame section and the inner edge portion of said narrow outer frame section while its outer longitudinal edge is provided with an inwardly turned flange and arranged between said wide outer frame section and the outer guide thereof.

12. A stencil holder comprising two outer frame sections one of which is wide and provided adjacent to one of its longitudinal edges with an opening and adjacent to its opposite longitudinal edge with an inwardly turned flange forming an outer guide, and the other outer frame being narrow and having an opening registering with the opening of the wide frame section and having its inner longitudinal edge forming an inner guide which coöperates with said outer guide and two narrow intermediate frame sections one of which is arranged between said wide outer frame section and said narrow outer frame section and provided with an opening registering with the openings in said outer frame section and provided at its opposite longitudinal edges with folded flanges, and the other intermediate frame section having its inner longitudinal edges arranged between the wide outer frame section and the inner edge portion of said narrow outer frame section while its outer longitudinal edge is provided with an inwardly turned flange and arranged between said wide outer frame section and the outer guide thereof.

GUY J. EVANS.